United States Patent [19]
Ejiri

[11] Patent Number: 5,271,716
[45] Date of Patent: Dec. 21, 1993

[54] CORELESS TORQUE CONVERTER
[75] Inventor: Eiji Ejiri, Kanagawa Pref., Japan
[73] Assignee: Nissan Motor Co., Ltd., Japan
[21] Appl. No.: 945,782
[22] Filed: Sep. 16, 1992
[30] Foreign Application Priority Data
  Nov. 6, 1991 [JP] Japan .................. 3-289733
[51] Int. Cl.$^5$ .................................. F01D 5/04
[52] U.S. Cl. ...................... 416/180; 416/197 C
[58] Field of Search ................... 416/180, 197 C
[56] References Cited
U.S. PATENT DOCUMENTS
  3,797,243 3/1974 Trustov ...................... 416/180
  3,891,350 6/1975 Adachi et al. ............... 416/180

OTHER PUBLICATIONS
Szydelski "New Type Three Element Torque Converter and Its Application to Mobile Equipment", SAE Technical Paper series, Sep. 8-11, 1986.

Primary Examiner—Edward K. Look
Assistant Examiner—Christopher Verdier
Attorney, Agent, or Firm—Lowe, Price, LeBlanc & Becker

[57] ABSTRACT

A coreless torque converter includes a pump impeller provided with coreless blades each having a first leading edge directed forward; a turbine runner provided with coreless blades each having a second leading edge directed rearward; and a stator provided with coreless blades each having front and rear edges which face the second and first leading edges respectively. Each of the first and second leading edges extends generally straight connecting radially outward and inward terminal ends thereof.

8 Claims, 5 Drawing Sheets

CORELESS TORQUE CONVERTER

BACKGROUND OF THE INVENTION

1. Field of the Invention

The present invention relates to torque converters, and more particularly to torque converters of a coreless type in which all of the three major elements (viz., pump impeller, turbine runner and stator) are coreless.

2. Description of the Prior art

In order to clarify the task of the present invention, one conventional coreless torque converter will be outlined with reference to FIG. 4 of the accompanying drawings, which converter is shown in SAE Paper 861213 and named as "Three Member Two Stage Type".

As shown in the drawing, the coreless torque converter comprises a pump impeller 100, a turbine runner 102 and a stator 104, which are the three major elements of the converter. These major elements 100, 102 and 104 have no cores at their blades. The torque converter of this coreless type can have two or three times of torque receiving capacity as compared with the common cored torque converter.

However, due to its inherent construction, the coreless torque converter has such a drawback that, since the blades of the pump impeller 100 and turbine runner 102 are formed with inwardly projected angular portions 100a and 102a to match in shape with the stator 104, the installation rigidity of the blades is relatively low and thus the characteristic frequency of each blade is low. Accordingly, during operation of the converter, such blades tend to vibrate due to vibration transmission from the engine and surge pressure by operating fluid running in the converter, which causes an undesired stress concentration at recessed parts 100b and 102b of the blades. In fact, when such stress becomes severe, crack may appear.

SUMMARY OF THE INVENTION

It is therefore an object of the present invention to provide a coreless torque converter which is free of the above-mentioned drawback.

According to the present invention, there is provided a coreless torque converter which can be constructed simply without sacrificing the performance thereof.

According to the present invention, there is further provided a coreless torque converter in which undesired vibration of the blades of the pump impeller and turbine runner can be suppressed or at least minimized.

According to the present invention, there is still further provided a coreless torque converter in which the durability of the blades is considerably increased.

According to a first aspect of the present invention, there is provided a coreless torque converter which comprises a pump impeller provided with coreless blades each having a first leading edge directed forward; a turbine runner provided with coreless blades each having a second leading edge directed rearward; and a stator provided with coreless blades each having front and rear edges which face the second and first leading edges respectively, wherein each of the first and second leading edges extends generally straight connecting radially outward and inward terminal ends thereof.

According to a second aspect of the present invention, there is provided a coreless torque converter which comprises a converter cover to which an engine torque is applied; a pump impeller coaxially connected to the converter cover to rotate therewith, the pump impeller being provided with coreless blades each having a first leading edge directed forward; a turbine runner interposed between the converter cover and the pump impeller in such a manner as to face the pump impeller, the turbine runner being provided with coreless blades each having a second leading edge directed rearward; a turbine hub on which the turbine runner is coaxially mounted to rotate therewith, the turbine hub being adapted to be connected to an input shaft of a driven device; and a stator located between the pump impeller and the turbine runner and connected to a case through a one-way clutch, the stator being provided with coreless blades each having front and rear edges which face the second and first leading edges respectively, wherein each of the first and second leading edges extends straight connecting radially outward and inward terminal ends thereof.

DETAILED DESCRIPTION OF THE INVENTION

Figure 1:
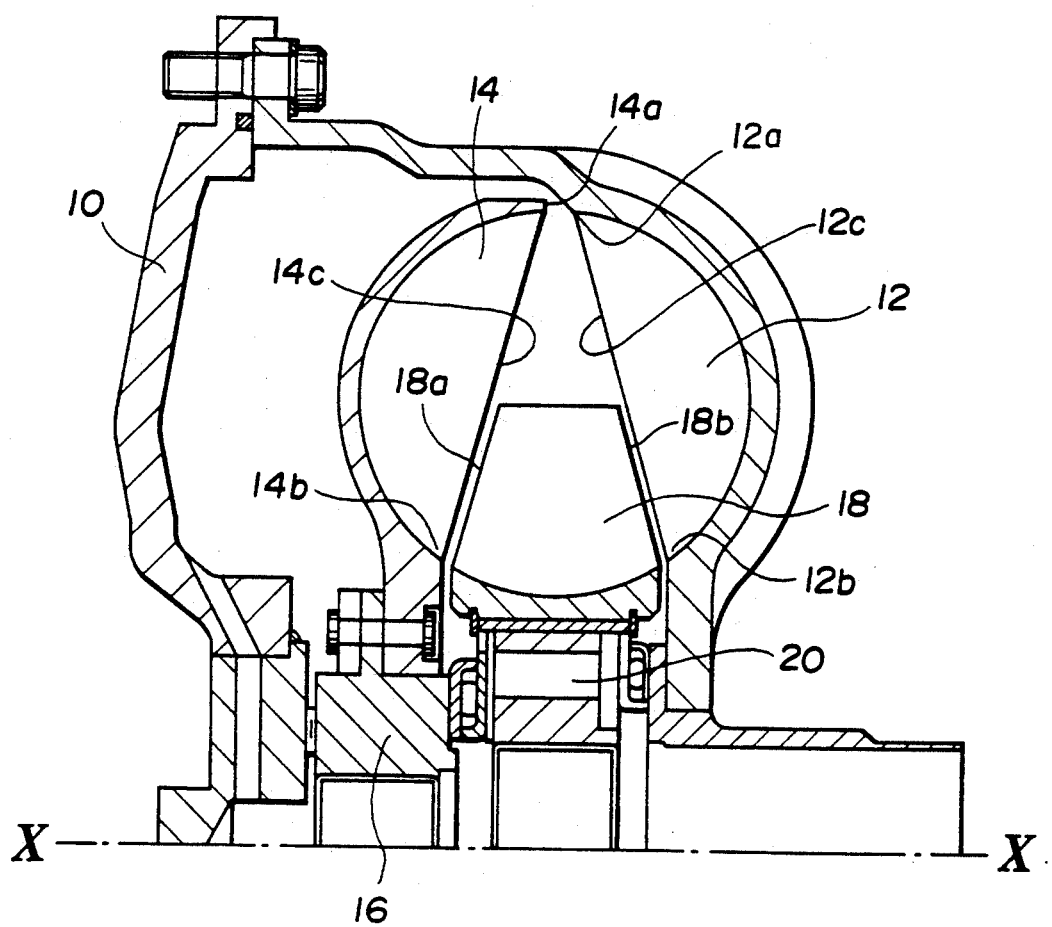
FIG. 1 is a sectional view of a coreless torque converter according to the present invention.

Referring to FIG. 1 of the drawings, there is shown a coreless torque converter according to the present invention.

The converter comprises a converter cover 10 to which an engine torque is applied. The converter cover 10 has a pump impeller 12 secured thereto. Arranged to face with the pump impeller 12 is a turbine runner 14 which is installed on a turbine hub 16. Although not shown in the drawing, an input shaft of a transmission is coaxially connected to the turbine hub 16. Sandwiched between the pump impeller 12 and the turbine runner 14 is a stator 18 which is connected to a case (not shown) through a one-way clutch 20. The pump impeller 12, the turbine runner 14 and the stator 18 are the three major elements of the converter. As is understood from the drawing, blades possessed by these three major elements 12, 14 and 18 are gathered at a certain position, but they are coreless.

As is seen from FIG. 1, the leading edge 12c of each blade of the pump impeller 12 extends obliquely but straight connecting radially outward and inward terminal ends 12a and 12b thereof. The leading edge 12c is inclined with respect to an axis X—X of the converter.

Similar to this, the leading edge 14c of each blade of the turbine runner 14 extends obliquely but straight connecting radially outward and inward terminal ends 14a and 14b thereof. The leading edge 14c is inclined with respect to the axis X—X.

As shown, the leading edge 12c of each blade of the pump impeller 12 and the leading edge 14c of each blade of the turbine runner 14 are so inclined as to decrease the distance therebetween with increase of a radial distance from the axis X—X of the converter.

Figure 4:
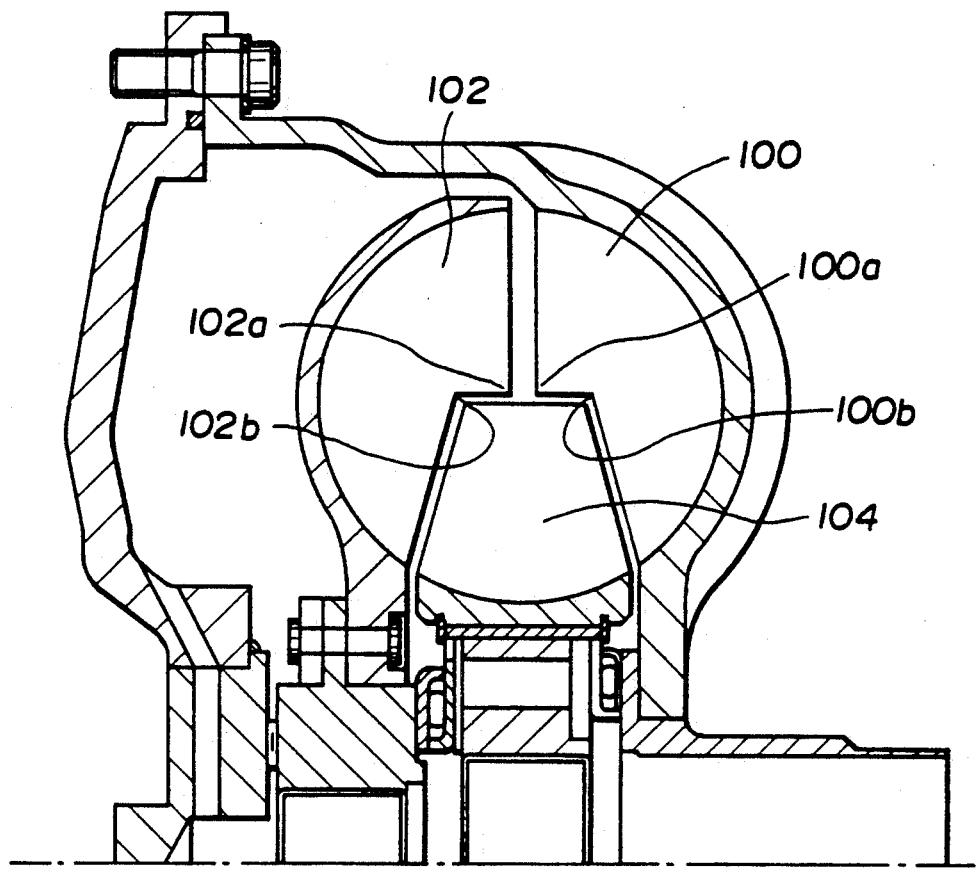
FIG. 4 is a sectional view of the conventional coreless torque converter.

Each blade of the stator 18 is generally trapezoidal in shape like the stator 104 of the conventional coreless type (see FIG. 4). Front and rear inclined edges 18a and 18b of the blade of the stator 18 extend in parallel with the leading edges 14c and 12c of the turbine runner 14 and the pump impeller 12 respectively. Thus, there are respectively defined even clearances "t" between the front edge 18a of the stator 18 and the leading edge 14c of the turbine runner 14 and between the rear edge 18b and the leading edge 12c of the pump impeller 12.

Figure 2:
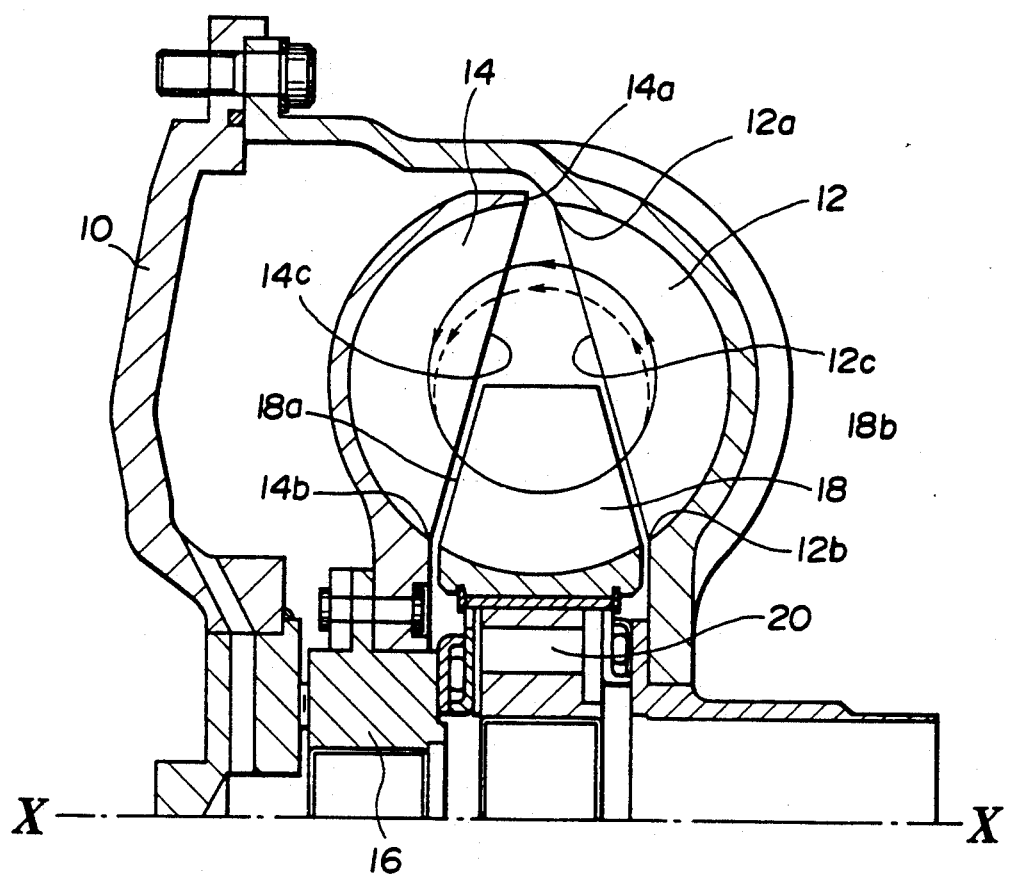
FIG. 2 is a view similar to FIG. 1, but showing the flow of operating fluid in the converter.

In the following, operation of the coreless torque converter of the present invention will be described with reference to FIG. 2.

When an engine torque is applied to the pump impeller 12 through the converter cover 10, the operating fluid in the converter is forced to make a circulation flowing around through the pump impeller 12, the turbine runner 14, the stator 18 and back through the pump impeller 12. Due to the work of the stator 18, the input torque is increased. The increased torque is outputted to the input shaft (not shown) of the transmission through the turbine runner 14 and the turbine hub 16.

Figure 3:
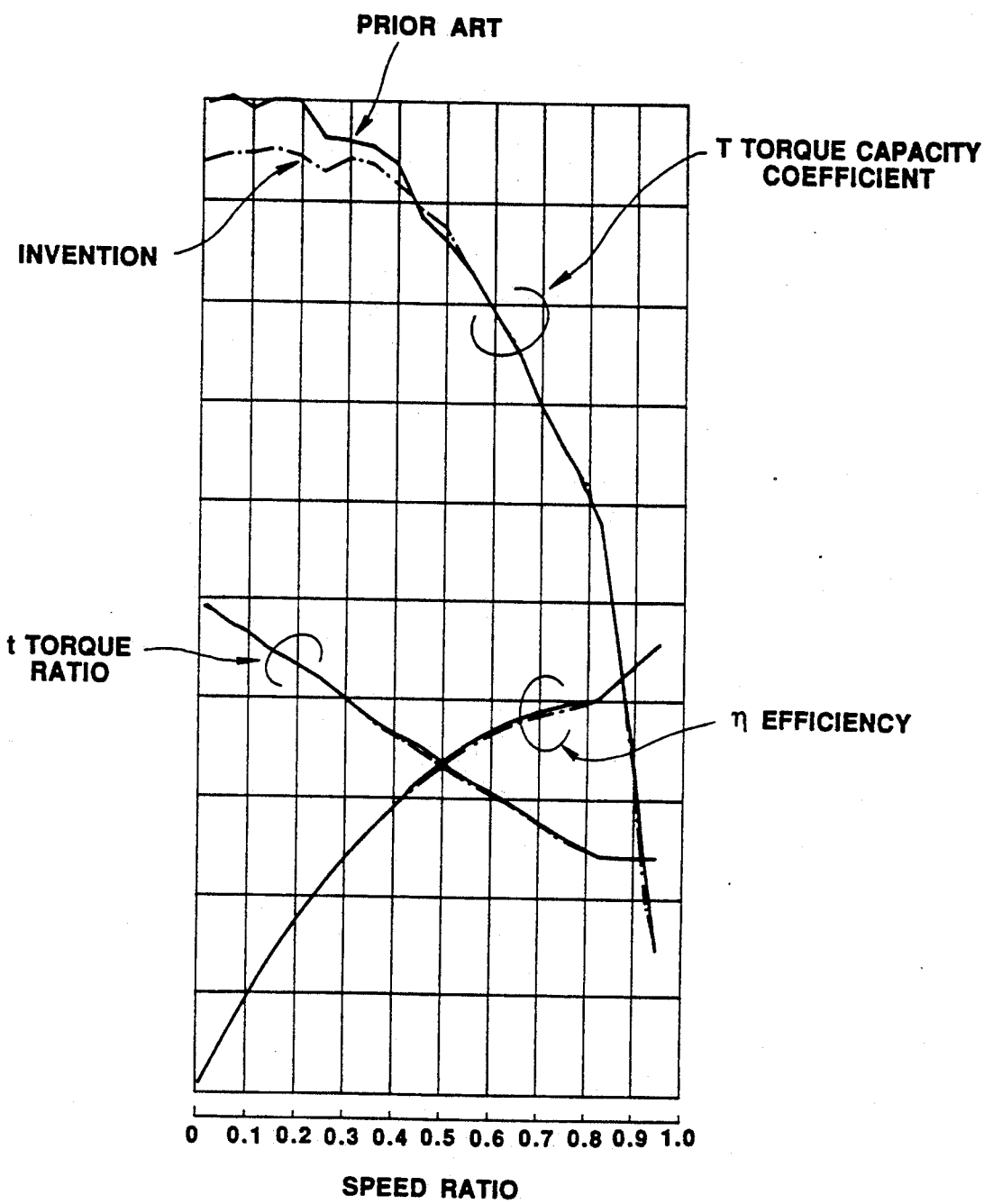
FIG. 3 is a graph showing performance of the coreless torque converter of the invention and that of a conventional coreless torque converter, respectively.

FIG. 3 is a graph depicting the performance of the coreless torque converter of the present invention, which is shown by phantom lines. For comparison, the performance of the conventional coreless torque converter of FIG. 4 is also depicted by solid lines. From this graph, it is understood that in connection with the torque ratio and the efficiency, the invention and the conventional converter show substantially the same performance.

While, in connection with the torque capacity coefficient, the invention shows a smaller value at a lower speed ratio (viz., stall side) as compared with the conventional converter. This is because, in the lower speed ratio, the operating fluid which flows through straight portions corresponding to the angular portions 100a and 102a of the conventional converter affects largely the entire flow of the operating fluid in the converter. That is, as is seen from FIG. 2, in a higher speed ratio, the one-dimensional mean flow of the operating fluid takes a relatively outer path as illustrated by the solid line, while, in the lower speed ratio, the mean flow is forced to take a relatively inner path as illustrated by the broken line, which path includes the straight portions corresponding to the angular portions 100a and 102a of the conventional converter. It is to be noted that the reduction in torque capacity coefficient in the stall side induces a lower fuel consumption in idling stage of the engine as well as improvement in accelerating ability of the associated vehicle at its starting.

In the following, advantages of the present invention will be described.

Because each blade of the pump impeller 12 and that of the turbine runner 14 have the above-mentioned straight leading edges 12c and 14c each connecting the radially outward and inward terminal ends 12a and 12b (or 14a and 14b), the pump impeller 12 and the turbine runner 14 can have highly robust constructions. That is, the installation rigidity of the blades of them 12 and 14 is high as compared with that of the above-mentioned conventional coreless torque converter. This means that the characteristic frequency of each blade of them 12 and 14 becomes high. That is, due to such a highly robust construction of the pump impeller 12 and turbine runner 14, the characteristic frequency of each blade is increased beyond the ordinary frequency range which is given under normal operation of the torque converter. Accordingly, the undesired resonant vibration of the blades is suppressed or at least minimized. Even when such resonant vibration takes place, the amplitude of the vibration is controlled small.

Because of the simple construction of each blade of the pump impeller 12 and the turbine runner 14 (that is, the construction having no angular portions like the portions 100a and 102a of the conventional converter), the undesired stress concentration does not occur. This advantage becomes more marked when the blades of the pump impeller 12 and the turbine runner 14 are constructed of stamped metal sheet. Furthermore, when the blades are constructed through casting, the product is prevented from having undesired biowholes because of smoothed flow of molten metal in the mold due to the simple configuration of the cavity of the mold.

When the coreless torque convener is applied to a motor vehicle, not only lower fuel consumption at idling stage but also improvement in accelerating ability of the vehicle at its starting is achieved.

Figure 5:
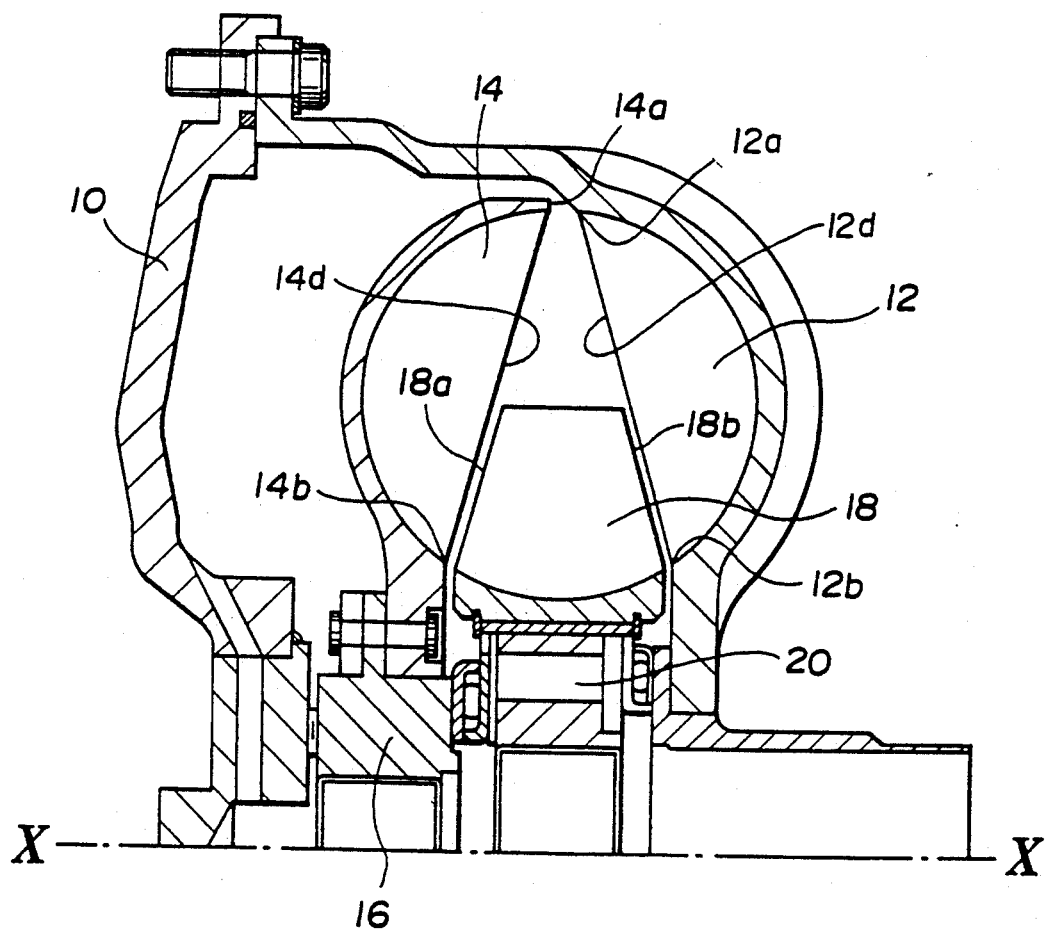
FIG. 5 is a sectional view of a coreless torque converter of the present invention showing curved leading edges.

Although the leading edges 12c and 14c of the pump impeller 12 and turbine runner 14 are described to extend straight, the leading edges 12c and 14c may be somewhat curved as shown in FIG. 5, leading edges 12d and 14d, long as they extend the outward and inward terminal ends 12a, 14a, 12b and 14b.

What is claimed is:

1. A coreless torque converter comprising:
    a pump impeller provided with coreless blades each having a first leading edge directed forward;
    a turbine runner provided with coreless blades each having a second leading edge directed rearward; and
    a stator provided with coreless blades each having front and rear edges which face said second and first leading edges respectively,
    wherein each of said first and second leading edges extends substantially straight therethroughout between radially outward and inward terminal ends thereof.

2. A coreless torque converter as claimed in claim 1, in which said first and second leading edges are straight and inclined so that the distance therebetween decreases with increase of a radial distance from an axis of the converter.

3. A coreless torque converter as claimed in claim 2, in which said front and rear edges of said stator are inclined and extend in parallel with said second and first leading edges.

4. A coreless torque converter as claimed in claim 3. in which there are respectively defined even clearances between said first leading edge and said rear edge and between said second leading edge and said front edge.

5. A coreless torque converter comprising:
    a converter cover to which an engine torque is applied;
    a pump impeller coaxially connected to said converter cover to rotate therewith, said pump impeller being provided with coreless blades each having a first leading edge directed forward;
    a turbine runner interposed between said converter cover and said pump impeller in such a manner as to face said pump impeller, said turbine runner being provided with coreless blades each having a second leading edge directed rearward;

a turbine hub on which said turbine runner is coaxially mounted to rotate therewith, said turbine hub being adapted to be connected to an input shaft of a driven device; and a stator located between said pump impeller and said turbine runner and connected to a one-way clutch, said stator being provided with coreless blades each having front and rear edges which face said second and first leading edges respectively, wherein each of said first and second leading edges extends substantially straight therethroughout between radially outward and inward terminal ends thereof.

6. A coreless torque converter as claimed in claim 5, in which said first and second leading edges are inclined so that the distance therebetween decreases with increase of a radial distance from an axis of the converter, and in which said front and rear edges of said stator are inclined and extend in parallel with said second and first leading edges.

7. A coreless torque converter comprising:
a pump impeller provided with coreless blades each having a first leading edge directed forward;
a turbine runner provided with coreless blades each having a second leading edge directed rearward; and
a stator provided with coreless blades each having front and rear edges which face said second and first leading edges respectively,
wherein each of said first and second leading edges are mildly curved and extend therethroughout between radially outward and inward terminal ends without forming any angled portion.

8. A coreless torque converter comprising:
a converter cover to which an engine torque is applied;
a pump impeller coaxially connected to said converter cover to rotate therewith, said pump impeller being provided with coreless blades each having a first leading edge directed forward;
a turbine runner interposed between said converter cover and said pump impeller in such a manner as to face said pump impeller, said turbine runner being provided with coreless blades each having a second leading edge directed rearward;
a turbine hub on which said turbine runner is coaxially mounted to rotate therewith, said turbine hub being adapted to be connected to an input shaft of a driven device; and
a stator located between said pump impeller and said turbine runner and connected to a one-way clutch, said stator being provided with coreless blades each having front and rear edges which face said second and first leading edges respectively,
wherein each of said first and second leading edges are mildly curved and extend therethroughout between radially outward and inward terminal ends without forming an angled portion.

* * * * *